United States Patent
Amthor et al.

(10) Patent No.: US 10,989,908 B2
(45) Date of Patent: Apr. 27, 2021

(54) AUTOMATED WORKFLOWS BASED ON AN IDENTIFICATION OF CALIBRATION SAMPLES

(71) Applicant: CARL ZEISS MICROSCOPY GMBH, Jena (DE)

(72) Inventors: Manuel Amthor, Jena (DE); Daniel Haase, Zöllnitz (DE); Thomas Ohrt, Golmsdorf (DE)

(73) Assignee: CARL ZEISS MICROSCOPY GMBH, Jena (DE)

(*) Notice: Subject to any disclaimer, the term of this patent is extended or adjusted under 35 U.S.C. 154(b) by 0 days.

(21) Appl. No.: 16/883,258

(22) Filed: May 26, 2020

(65) Prior Publication Data

US 2020/0379236 A1 Dec. 3, 2020

(30) Foreign Application Priority Data

May 27, 2019 (DE) .................... 10 2019 114 117.6

(51) Int. Cl.
*G02B 21/36* (2006.01)
*G06T 7/80* (2017.01)
(Continued)

(52) U.S. Cl.
CPC .......... *G02B 21/365* (2013.01); *G06K 9/628* (2013.01); *G06N 3/08* (2013.01); *G06T 7/80* (2017.01);
(Continued)

(58) Field of Classification Search
CPC ............. G02B 21/365; G06T 7/80; G06T 2207/20081; G06T 2207/20084; G06T 2207/10056; G06N 3/08; G06K 9/628
See application file for complete search history.

(56) References Cited

U.S. PATENT DOCUMENTS 5,787,189 A * 7/1998 Lee .................... G06K 9/42
382/133
6,529,626 B1 * 3/2003 Watanabe ............. G06T 7/55
345/427
(Continued)

FOREIGN PATENT DOCUMENTS

DE 102017111718 A1 12/2018
WO 2009092697 A2 7/2009
WO 2016061563 A1 4/2016

OTHER PUBLICATIONS

Decision to Grant dated May 8, 2020 in related/corresponding DE Application No. 10 2019 114 117.6.
(Continued)

*Primary Examiner* — James M Pontius
(74) *Attorney, Agent, or Firm* — Patent Portfolio Builders PLLC

(57) ABSTRACT

A method and a corresponding calibration system for calibrating a microscope system involve a recording of an overview image of a sample stage of the microscope system and an identification of a calibration sample in the recorded overview image. Moreover, The calibration sample in the recorded overview image is classified into one of a plurality of calibration sample classes using a classification system, which was trained using training data, in order to form a model so that the classification system is adapted for classifying unknown input data into prediction classes. A of a calibration workflow for calibrating the microscope system is selected based on the classified calibration sample class. The selection is performed using a workflow indicator value serving as an input value for a workflow selection system.

13 Claims, 6 Drawing Sheets

(51) Int. Cl.
    *G06K 9/62*    (2006.01)
    *G06N 3/08*    (2006.01)
(52) U.S. Cl.
    CPC .............. *G06T 2207/10056* (2013.01); *G06T 2207/20081* (2013.01); *G06T 2207/20084* (2013.01)

(56) References Cited

U.S. PATENT DOCUMENTS

| | | | |
|---|---|---|---|
| 9,767,349 B1* | 9/2017 | Shreve | G06K 9/00315 |
| 9,797,767 B2 | 10/2017 | Corwin et al. | |
| 2004/0068193 A1* | 4/2004 | Barnes | A61B 5/7264 |
| | | | 600/476 |
| 2006/0083418 A1* | 4/2006 | Watson | G06T 7/62 |
| | | | 382/133 |
| 2006/0233423 A1* | 10/2006 | Najafi | G06T 7/75 |
| | | | 382/103 |
| 2007/0211243 A1 | 9/2007 | Laroche et al. | |
| 2013/0226548 A1* | 8/2013 | Beck | G06T 7/0012 |
| | | | 703/11 |
| 2014/0340482 A1* | 11/2014 | Kanarowski | G01N 21/64 |
| | | | 348/46 |
| 2015/0302276 A1* | 10/2015 | Guan | G06K 9/00771 |
| | | | 382/159 |
| 2015/0347804 A1* | 12/2015 | Feng | G06K 9/001 |
| | | | 382/124 |
| 2016/0202171 A1* | 7/2016 | Kavsek | G01N 15/1456 |
| | | | 356/39 |
| 2018/0033145 A1* | 2/2018 | Schoenberg | G06T 5/40 |
| 2018/0061066 A1 | 3/2018 | Frise et al. | |
| 2018/0108172 A1* | 4/2018 | Huston | G06Q 50/01 |
| 2018/0268292 A1* | 9/2018 | Choi | G06K 9/6217 |
| 2019/0150726 A1* | 5/2019 | Giusti | A61B 3/0025 |
| 2019/0295814 A1* | 9/2019 | Franken | H01J 37/28 |
| 2020/0088984 A1 | 3/2020 | Haase et al. | |
| 2020/0116627 A1* | 4/2020 | Kessler | G01J 3/501 |
| 2020/0134939 A1* | 4/2020 | Schell | G07C 5/0841 |
| 2020/0170534 A1* | 6/2020 | Flaeschner | A61B 5/6803 |
| 2020/0175113 A1* | 6/2020 | Scriven | G06N 20/00 |
| 2020/0202561 A1* | 6/2020 | Liu | G06F 3/013 |

OTHER PUBLICATIONS

Office Action dated Apr. 9, 2020 in related/corresponding DE Application No. 10 2019 114 117.6.

* cited by examiner

AUTOMATED WORKFLOWS BASED ON AN IDENTIFICATION OF CALIBRATION SAMPLES

FIELD OF THE INVENTION

Exemplary embodiments of the invention relate to a calibration of a microscope system and, in particular, to a computer-implemented method for calibrating a microscope system, a corresponding calibration system, and a corresponding computer program product.

BACKGROUND

Microscope systems are used not only for imaging but increasingly for measuring purposes as well. Moreover, the data of imaging systems are increasingly being used for obtaining statistical data (ever greater number of measurements to verify results with facts/statistics, or QM for the manufacturing of parts, etc.), which also requires the use of various systems (parallelization). Additionally, there are manufacturing ranges in the case of, e.g., objectives (NA and magnification, different CORR ring settings), which supply different results when using different microscopes.

It is for this reason that optical systems have to be calibrated in order to offset the variation, e.g., from manufacturing or running operation, again. Tightening the manufacturing tolerances would be connected with a huge increase in costs, which customers can no longer accept or pay. A further problem is that, over time, components age or lose performance due to incorrect use, such as, for example, the excitation power of LEDs or lasers, the positioning of mechanical components, filter performance and sensitivities of detectors. These modifications must be adapted to the measurement logs over time.

Additionally, imaging facilities represent an ever-increasing group of customers. An imaging facility provides imaging systems for a relatively large, regional customer base, the use of which must be paid for by the customer. In return, the imaging facilities make operational systems available to the user and provide application-related assistance. For this reason, the status of the systems is checked and determined on a weekly basis, for example, in an imaging facility. This means a great outlay in terms of time and staff that is becoming an ever greater problem for many facilities as the measurements, too, are becoming ever more comprehensive (PSF objectives, light output, resolution, illumination, repositioning, etc.).

Moreover, calibrations play an important role in the subjects of (i) sample navigation by means of an overview camera—here, the calibration is necessary to correct distortions and the perspective of the overview camera and to determine the relative position of the overview camera with respect to the stage and the objective—and (ii) correlative workflows (=shuttle-and-find=using a sample in a plurality of microscopes). Here, the sample carrier has certain calibration markings, by means of which, inter alia, it is possible to exactly determine its relative position, type and further features.

Previous calibration methods regularly had a number of disadvantages: Normally, calibration must be started by hand and explicitly. Additionally, a calibration sample has to be selected by hand—or by means of a handbook. In the process, there can be an incorrect calibration as a result of incorrect operation (wrong sample for a specific calibration) or incorrect analysis of the data (different algorithms, measurement points).

Moreover, relevant regions of the calibration sample must be driven to manually or the calibration sample must be situated exactly at a defined position in order to drive to regions based on information from a database. Moreover, it could be the case that the correct alignment/relative position of the calibration sample is not ensured and/or there is no adaptation of the calibration workflow to the system configuration. Here, adapting the calibration workflow to the configuration of the microscope system (e.g., different stages, filters, light sources, . . . ) is essential for good results. Moreover, there may be a lack of reproducibility of calibration measurements since users have carried these out entirely by hand.

Furthermore, what should be taken into account is that servicing of microscope systems requires educated users and it may take a very long time for someone to gain the necessary knowledge. Moreover, a great time and staff outlay is required in the case of a plurality of system installations since servicing other than a limited service/assistance via remote servicing is frequently not possible.

Furthermore, equipping a calibration sample with, e.g., RFID technology was required for the automatic identification thereof.

Therefore, exemplary embodiments of the invention are directed to automatically starting the calibration of a microscope system and automatically selecting a fitting workflow for calibration of a microscope system in order thus to simplify, standardize and improve the efficiency and accuracy of the calibration tasks. Furthermore, the specific performance of the calibration process should be monitored and documented when necessary.

SUMMARY OF THE INVENTION

According to a first aspect of the present invention, a computer-implemented method for calibrating a microscope system is provided. The method may include a recording of an overview image of a sample stage of the microscope system and identifying a calibration sample in the recorded overview image.

Moreover, the method may include a classification of the calibration sample in the recorded overview image into one of a plurality of calibration sample classes by means of a classification system, which was trained using training data, in order to form a model so that the classification system is adapted for classifying unknown input data into prediction classes.

Furthermore, the method may include a selection of a calibration workflow for calibrating the microscope system based on the classified calibration sample class, wherein the selection is implemented by means of a workflow indicator value, which can serve as an input value for a calibration system.

Additionally, attention is drawn to the fact that the identification of the calibration sample, i.e., the determination of an inserted sample being a calibration sample, is implemented automatically when any sample is inserted on the sample stage. Thus, should the inserted sample be identified as a calibration sample, the correct calibration workflow is automatically introduced. Advantageously, the method can also ensure the correct performance and check the relative position and state of the calibration sample.

Should the presence of a calibration sample be recognized or identified, the latter is classified so that the fitting workflow can be selected.

According to a second aspect of the present invention, a corresponding calibration system for calibrating a microscope system is provided. The calibration system can comprise a recording system adapted for recording an overview image of a sample stage of the microscope system and an identification unit which is adapted for identifying a calibration sample—i.e., in particular, for identifying/determining a calibration sample—in the recorded overview image.

Furthermore, the calibration system can have a classification system adapted for classifying the calibration sample in the recorded overview image into one of a plurality of calibration sample classes. Here, the classification system may have been trained using training data in order to form a model such that the classification system is adapted for classifying unknown input data into prediction classes.

Additionally, the calibration system may have a selection module, which is adapted for selecting a calibration workflow for calibrating the microscope system based on the classified calibration sample class, wherein the selection can be performed by means of a workflow indicator value, which serves as an input value for the calibration system.

Embodiments may furthermore be implemented in the form of a corresponding computer program product able to be accessed by a computer-usable or computer-readable medium that contains program code for use by or in connection with a computer or instruction execution system. In the context of this description, a computer-usable or computer-readable medium may be any apparatus that has means for storing, communicating, forwarding or transporting the program for use by or in connection with an instruction execution system, a corresponding apparatus or piece of equipment.

The computer-implemented method for calibrating a microscope system has a plurality of advantages and technical effects:

First, it is possible to dispense with manual or explicit triggering of the calibration process. The calibration sample need not be selected manually from a drop-down menu. It can be carried out quickly and efficiently. An incorrect calibration as a result of incorrect operation (e.g. wrong sample for a specific calibration) and incorrect analysis of the data (different algorithms, measurement points) can be avoided. Relevant regions of the calibration sample no longer need to be driven to manually and the calibration sample need not be situated exactly at a defined position either in order to drive to regions of the calibration sample based on information from a database.

Furthermore, it is possible to largely dispense with the correct alignment/relative position of the calibration sample since measures of the selected workflow are able to ensure that the correct alignment of the sample is also undertaken. Moreover, a manual adaptation of the calibration workflow to the system configuration can be dispensed with since all parameters are set correctly in accordance with the calibration workflow. That is to say, the calibration workflow can automatically be adapted to the configuration of the system (e.g., different stages, filters, light sources, . . . ).

Moreover, it is possible to guarantee reproduction by an identical performance and analysis of the parameters of the calibration measurements since users always perform the calibration according to the same predetermined method by means of the disclosures herein.

This can significantly reduce the demands on the users performing the calibrations, and so highly trained users, whose training takes a very long time and is very costly, are no longer required for maintenance measures.

A great outlay in terms of time and staff is normally required in the case of a plurality of systems; this can also be significantly reduced and assistance by remote maintenance or remote servicing is substantially simplified. By way of example, calibration samples that should be identified automatically previously each needed to be equipped with an RFID chip and a complicated examination of the relative position or state of the sample would be necessary. This can now be dispensed with.

Overall, this yields a multiplicity of positive consequences in the form of clear advantages by way of the employed concept presented here, which would not be achievable by conventional measures, or would only be achievable with great difficulty and/or high costs.

Further embodiments of the inventive concept for the method, which could equally and accordingly apply to the corresponding calibration system, are discussed below:

According to one embodiment of the method, the overview image can be recorded by means of an overview camera or by means of an objective of the microscope system. Here, the aperture angle of the objective of the microscope system should lie above a predefined threshold (guaranteed field of view) in order to ensure that a sufficient portion of the calibration sample, and optionally a portion of the sample stage, too, is capturable. This allows recording systems already present on the microscope to be used. Retrofitting for making available base image data for the calibration system or the corresponding method would only be expedient in the case of a microscope system comprising neither an overview camera nor an objective with a sufficiently large field of view.

According to a further embodiment of the method, the classification can be implemented based on at least one typical feature of the calibration sample. Here, the typical feature can be selected from the group consisting of a geometry feature, a label, a texture, a material, an arrangement of calibration regions and a color. These typical features are represented by the recorded image data.

Special, typical geometry features are, e.g., a special form of the calibration sample, optically capturable patterns, specifically attached to the calibration sample, such as special angles in, e.g., an L-form, checkerboard-like patterns, specifically aligned triangular patterns, etc. In principle, any optically capturable feature is thus conceivable, provided it has a certain distinguishing power and is consequently able to be captured by a detection and/or classification system. The group of typical features may also include specific labels, the position and alignment of which may also represent a geometric feature. Moreover, the label itself can be identified and assigned by means of an OCR (optical character recognition) method. By way of example, this can directly yield a workflow indicator value without requiring a further, more complicated classification.

In relation to a material identification of the calibration sample, it is possible to resort to material properties of the calibration sample, such as, e.g., the texture or else reflection properties. Here, calibration samples made of paper, cardboard or plastic can be assigned to different calibration workflows than those consisting of, e.g., metal and having different reflective properties, for example.

When arranging calibration features or calibration regions on the calibration sample, it is possible to use relationships between the relative positions of individual marker regions which can be used for the calibration, either among themselves or else in relation to the sample carrier, in order to derive or assign an indicator value therefrom for the selection of the calibration workflow.

According to a further advantageous embodiment of the method, the classification system can be a neural network. Neural networks are particularly well-suited for classification tasks of the predefined type, in particular for classifying optical patterns which are available as pixels of image data—in particular of the recorded image.

However, the classification system is not restricted to any type of neural network; instead, other classification systems can also be used, such as, e.g., support vector machine (SVM) algorithms and associated systems or those which are based on decision trees or classification approaches as per a random forest or nearest neighbor. In principle, any relevantly trainable classification system based on the principles of machine learning can be used for pattern recognition.

According to an embodiment of the method, the identification of the calibration sample can moreover be supported or influenced by contextual information. Here, the contextual information can be selected from the group comprising: an indicator signal for a calibration position of the microscope system, an initialization signal for the calibration (e.g., replacing the stage insert), a software trigger of the calibration mode, an indicator signal for a probability or the expected value of the presence of a calibration sample (e.g., if the system has not been calibrated for a certain amount of time). Advantageously, this contextual information can be obtained from state monitoring of the microscope system and/or from a certain user action.

Microscope systems may provide a predetermined calibration position of components of the microscope system, which can be captured automatically and based on which the calibration sample is identified. Furthermore, an initialization signal for the calibration can influence the identification of the calibration sample. By way of example, provision can be made for the microscope system to be calibrated by a certain calibration workflow after a certain number of operating hours or according to the corresponding calendar entries, or for the probability of a calibration sample being inserted to be increased. Respectively different calibration workflows may be provided after a certain number of operating hours or according to correspondingly specified calendar entries.

According to a further supplementary embodiment, the method may include a localization of a region—in particular, at least one region—required for the calibration in the recorded overview image. Here, this can be a specific calibration mark or else e.g. the position of the calibration sample in or on the sample stage. This region is then used in targeted fashion during the calibration, i.e., the sample stage is driven in such a way that the region is correctly positioned in the field of view of the microscope objective for the purposes of the calibration and a high-resolution calibration image is recorded. The calibration procedure itself is known to a person skilled in the art. Certain features (e.g., size, color, brightness, etc.) of the known calibration sample are known. The recorded high-resolution image can be evaluated, and the microscope components are internally re-adjusted (e.g., illumination, magnification factor, intrinsic and extrinsic parameters of the camera) until the image substantially resembles a specimen image.

According to a further advantageous embodiment of the method, the calibration procedure can moreover be influenced by an identification of symbols on the calibration sample or by incorrect positioning of the calibration sample, e.g., inserted the wrong way round or damaged. A multiplicity of calibration marks are considered for the symbols, such as, for example, a checkerboard pattern, an inscribed sticker, which may be written by machine or handwritten, specifically formed position markers, etc. In individual cases, this may also relate to the entire calibration sample, optionally with parts of the sample stage as well.

According to a further advantageous embodiment, the method may include loading a control system—implemented in hardware and/or software—of the microscope system with control commands to start and carry out the selected calibration workflow.

If the presence of the calibration sample was identified, the method may output certain information to the user and/or to the system for internal further processing, such as the identification (ID) of an individual calibration sample, the type of calibration sample (e.g., manufacturer, sample type, use purpose), geometry and the relative position of the calibration sample on the sample stage or an indication whether a relevant region of the calibration sample, such as e.g. a cover slip or another measurement region, was identified. Certain information attached to the calibration sample can likewise be output to the user (e.g., a label containing information relevant to the measurement).

The identification of the presence of the calibration sample may also comprise the identification of an incorrect operation or of damage to the calibration sample and a corresponding user instruction. By way of example, the calibration sample could be inserted incorrectly into the frame or it could be dirtied or damaged. Naturally, known image analysis processes, in particular from machine learning, can be used in this step.

Various actions can be triggered once a calibration sample is identified. Mentioned by way of example here are the following:
- automatically starting the calibration workflow taking account of the ascertained workflow indicator value (by way of example, a typical calibration procedure is described in U.S. Pat. No. 9,797,767 B2);
- storing in an event database the fact that a calibration sample was recognized and classified;
- outputting a notification or message (e.g., email) to the manufacturer of the microscope system;
- presenting a drop-down menu of possible actions (e.g., the available calibration options).

According to an embodiment, the method may include the setting of components of the microscope system based on the selected calibration workflow. In the process, individual subsystems or parts and/or components of the microscope system can be calibrated and/or provided with new basic settings. By way of example, an aged laser used for fluorescence examinations and only still emits a reduced light output can be set in such a way that its original light output is re-established or made available.

An optional embodiment of the method may additionally provide for storing of the calibration results of the microscope system and the parameter values of the performed calibration workflow in a data memory, for example in a database. These data can be evaluated currently or at a later time for the individual microscope system or for a multiplicity of comparable microscope systems in order to optimize preventative servicing measures. Furthermore, the current state of the device is known at all times and all implemented measures can be reconstructed within the scope of servicing provisions.

A further optional embodiment of the method can provide for the generation of a service signal, which is indicative of the identification of a calibration sample, and of the transmission of the signal. By way of example, the service signal can be transmitted to the manufacturer or a commissioned servicing company. Moreover, it may have further information about the status of the calibration.

BRIEF DESCRIPTION OF THE DRAWING FIGURES

It is pointed out that exemplary embodiments of the invention may be described with reference to different implementation categories. Some exemplary embodiments are in particular described with reference to a method, whereas other exemplary embodiments may be described in the context of corresponding apparatuses. Regardless of this, it is possible for a person skilled in the art to recognize and to combine possible combinations of the features of the method and also possible combinations of features with the corresponding system from the description above and below—if not specified otherwise—even if these belong to different claims categories.

Aspects already described above, and additional aspects of the present invention become apparent inter alia from the exemplary embodiments that are described and from the additional further specific refinements described with reference to the figures.

Preferred exemplary embodiments of the present invention are described by way of example and with reference to the following figures.

DETAILED DESCRIPTION OF THE FIGURES

Figure 1:
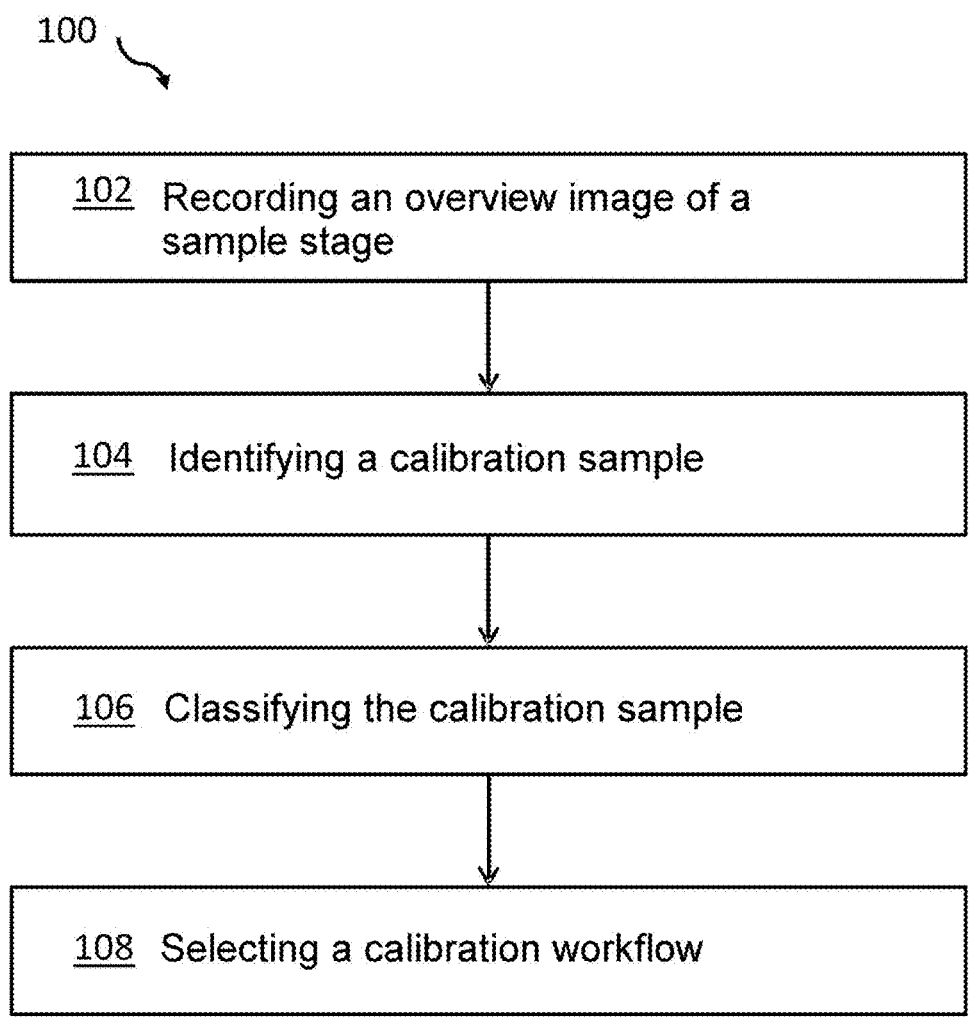
FIG. 1 illustrates a block diagram of one exemplary embodiment of the computer-implemented method according to the invention for selecting a calibration workflow.

In the context of this description, conventions, terms and/or expressions should be understood as follows:

The term "microscope system" describes an industrial usable microscope system—e.g., in the medical field, in the pharmacological field, in research or in the field of materials testing (e.g., quality assurance). As is known, it comprises components such as a displaceable sample stage (usually displaceable in the X-, Y- and Z-direction) with a sample carrier, an illumination system, an imaging system with one or more objectives, the imaging data of which are steered onto an image sensor or camera and are then available for further evaluation and possible display by downstream units. The image data are available as pixel data. An overview camera may also be present.

The term "overview image" describes an image, recorded at a comparatively low resolution, of part of the sample stage of the microscope system with an inserted sample. This could be the calibration sample. In contrast thereto, an image recorded at a comparatively high resolution is used for the actual calibration procedure.

The term "sample stage" denotes the part of the microscope system used to receive or hold (e.g., as a receiving apparatus) samples. It can be displaced vertically or horizontally (e.g., by means of motor drives) with respect to the objective for focusing measures and/or for selecting image sections, i.e., also within the scope of calibration measures.

The term "calibration sample" describes a sample with a specific embodiment, for insertion in or on the sample stage, which is practically only used for calibration purposes. The prior art has disclosed a multiplicity of (partly standardized) calibration samples (e.g., manufactured by Agar Scientific Ltd., Ted Pella Inc.) for different purposes.

Examples of calibration samples may include:
(i) checkerboard patterns for calibrating the overview camera, e.g., the distance from the objective and/or limb;
(ii) a correlative sample holder having a plurality of "L" markings by means of which the relative position can be unambiguously determined in various microscopes; this allows measurements/calibrations in various microscopes to be superposed;
(iii) a filar micrometer for determining the exact magnification;
(iv) fluorescence reference samples for determining the laser light illumination;
(v) universal calibration samples;
(vi) measuring grid;
(vii) confocal calibration kits.

Further calibration samples are known and can be supplemented at any time in order to increase the available number of supported calibration workflows.

The term "calibration workflow" describes a predetermined course of measures on or with the microscope system, or one or more of the components thereof, and at least one calibration sample for setting an optimal function of the microscope system. This may be expedient upon commissioning, following repair measures or else during regular use of the microscope system in order to regularly maintain the functionality of the microscope system.

The term "workflow indicator value" describes a signal with a corresponding signal value that can be used as an input signal for a workflow selection module so that a workflow to be selected can be uniquely assigned.

The term "calibration system" describes a functional unit that can bring about a selection of a workflow for calibration of a microscope system. There is an automatic assignment and selection of a calibration workflow based on recorded image data and the evaluation thereof by means of a classification system.

Here, the term "workflow" describes an ordered sequence of defined work steps, which are partly run through by hand and/or partly or completely run through in automated fashion, for calibrating a microscope system. Within the scope of manual work steps, the user can be assisted by instructions, e.g., what should be carried out next.

The term "classifying" describes the process of assigning a recorded image to one of a predetermined number of classes, provided the presence of a calibration sample—or possibly of a detected specific region therein—was recognized or identified. This can be implemented by means of a classification system.

The term "classification system"—also referred to as classifier in the context of machine learning—describes a machine learning-based system which, by way of training using training data, is put into a position where it can assign input data—image data of recorded samples (or also at least part of the sample stage), features of the sample and/or also an interaction of the sample with the sample stage, here in particular—to a certain class (in particular, a predetermined workflow).

It should also be noted in this case that a classifier typically classifies into a predefined number of classes. This is normally achieved by virtue of a classification value of the input data being determined for each class and a WTA (winner takes all) filter selecting the class having the highest classification value as the classified class. In classifiers, the difference from a 100% classification value is often used as a quality parameter of the classification or as a probability of the correctness of the classification. The selection system can generate an error message in the case of unclear classification results, for example if the difference between the most probable class and the next most probable class lies below a predetermined threshold (e.g., 30%).

The term "machine learning" is a basic term or a basic function in artificial intelligence, wherein statistical methods, for example, are used to give computer systems the ability to "learn". By way of example, certain behavioral patterns within a specific task range are optimized in this case. The methods that are used give the trained machine learning systems the ability to analyze data without requiring explicit procedural planning for this purpose. Typically, for example, an NN (neural network) or CNN (convolutional neural network) is an example of a system for machine learning, for forming a network of nodes which act as artificial neurons and for artificial connections between the artificial neurons—so-called links—wherein parameters—e.g., weight parameters for the link—can be assigned to the artificial links. When training the neural network, the weight parameters of the links adjust automatically based on input signals so as to generate a desired result. In the case of supervised learning, the images supplied as input values (training data)—generally (input) data—are supplemented with desired output data (annotations) in order to generate a desired output value (desired class). Considered very generally, mapping of input data onto output data is learned.

In this case, the term "training the classification system" means that, e.g., a machine learning system is adjusted by a plurality of example image parameter values in an, e.g., neural network by partially repeatedly evaluating the example images in such a way as to assign even unknown images to one or more classes on which the learning system has been trained following the training phase. The example images are typically annotated—that is to say provided with metadata—in order to generate desired results based on the input images.

The term "convolutional neural network"—as one example of a classifier—describes a class of artificial neural networks that are based on feedforward techniques. They are often used for image analysis using images or pixels thereof as input data. The main component of convolutional neural networks is, in this case, convolution layers (hence the name) that allow efficient evaluation through parameter sharing. Typically, each pixel of the recorded image is assigned to an artificial neuron of the neural network as an input value.

Mention is also made of the fact that deep neural networks consist of a plurality of layers having different functions, for example an input layer, an output layer and one or more interposed layers, for example for convolution operations, applying non-linear functions, dimension reduction, normalization functions, etc. The functions may be "executed in software" or special hardware assemblies may take over the calculation of the respective function values. Combinations of hardware and software elements are also known.

A detailed description of the figures is given below. It is understood in this case that all of the details and information in the figures are illustrated schematically. What is illustrated first of all is a block diagram of one exemplary embodiment of the computer-implemented method according to the invention for calibrating a microscope system. Further exemplary embodiments or exemplary embodiments for the corresponding system are described below:

FIG. 1 illustrates a block diagram of an exemplary embodiment of the computer-implemented method 100 according to the invention for a calibration of a microscope system. Here, the method 100 provides a recording, 102, of an overview image of a sample stage of the microscope system and an identification, 104, of the presence of a calibration sample in the recorded overview image. This identification can be implemented, first, by pattern recognition using detection/segmentation or else already using a classification. Here, all the image data of the overview image can be used for further processing, or else this may already refer to restricted, segmented regions (from the detection) in the recorded overview image. Naturally, the detected image regions are linked to a coordinate system of the sample stage. Recording the overview image is implemented using an electronic image recording system, for example a CCD (charge coupled device) chip or the like, and associated downstream electronic components. Moreover, the overview image can be presented on a corresponding monitor.

Furthermore, the method 100 provides for classification, 106, of at least the calibration sample in the recorded overview image—or in accordingly preselected, segmented regions—into one of a plurality of calibration sample classes by using a classification system. Here, a classification system was trained using training data in advance in order to form a model—i.e., a corresponding data model for an associated system of machine learning—such that the classification system is adapted for classifying unknown input data into prediction classes.

Furthermore, the method 100 provides for selection, 108, of a calibration workflow from a multiplicity of possible calibration workflows for calibrating the microscope system based on the classified calibration sample class, the selection being performed by means of a workflow indicator value which serves as an input value for the calibration system. Here, the work indicator value can be an output value of the classification system. The calibration workflows can be recalled from a storage system in which they are stored. The calibration workflows consist of instructions for setting, for adjusting, for servicing and for further steps necessary for calibrating the microscope system, which are carried out automatically by the microscope system, semi-automatically (or else fully automatically) in conjunction with a user with the microscope system or completely manually. In the last case, the necessary work steps can be presented on a display of the microscope system. In all three of the cases, the microscope system can detect—at least in part—by way of sensors which steps of the calibration have already been performed and which are still required. An interactive and integrated control and work instruction presentation guides the calibrating user through the required work steps. Selected microscope systems can perform individual calibration steps or a completely specifically selected calibration in completely autonomous fashion.

Moreover, the method 100 may also provide the calibration procedure of individual systems and components of the microscope system directly in accordance with the selected workflow.

Figure 2:
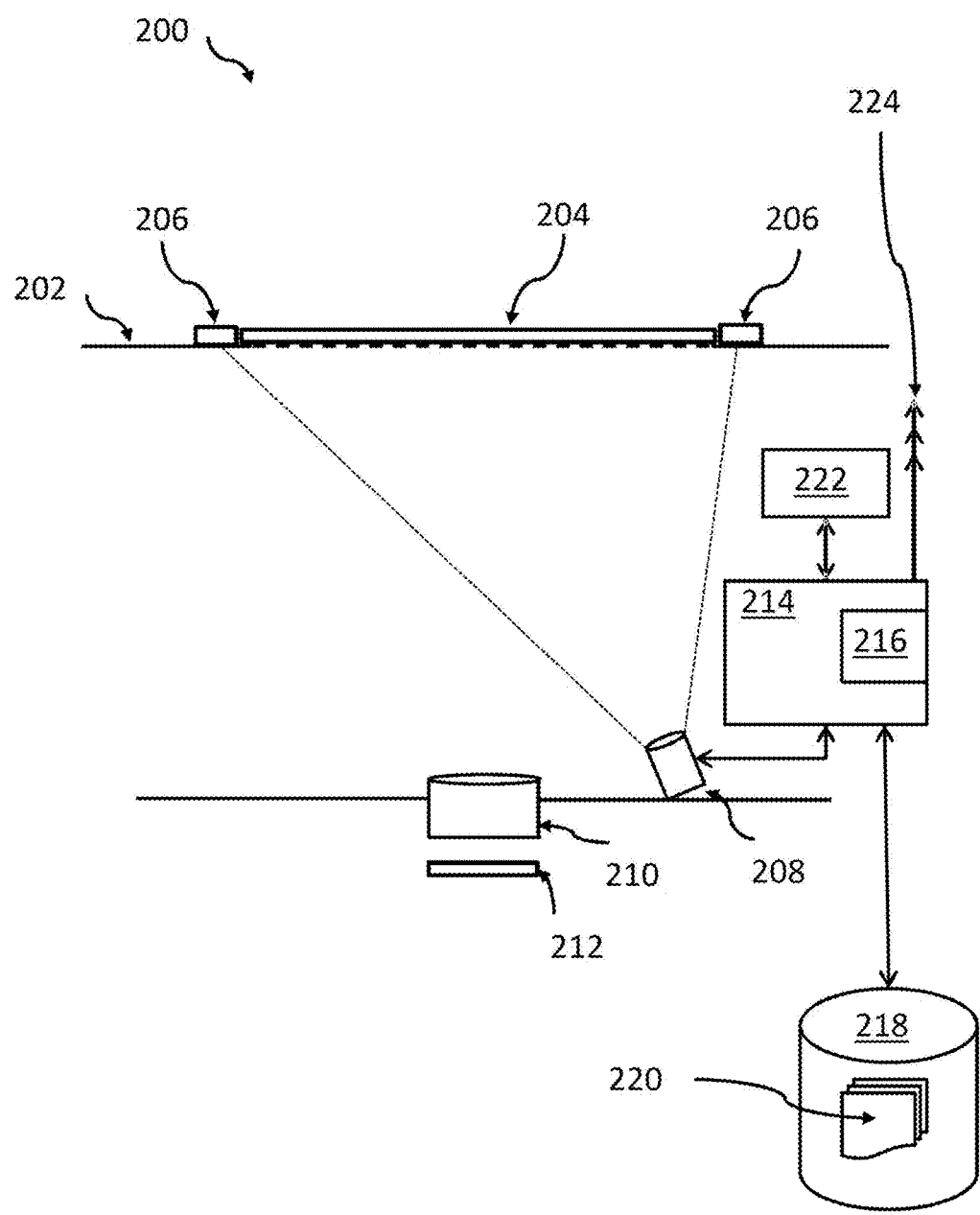
FIG. 2 illustrates a schematic diagram of an exemplary positioning of individual components.

FIG. 2 illustrates a schematic diagram 200 of an exemplary positioning of individual components. The calibration sample 204 rests on the sample stage 202 and is affixed there by holders 206. An image recording apparatus—either, e.g., an overview camera 208 or an objective 210 of the microscope system—records at least one image of the sample stage 202, potentially in conjunction with the calibration sample 204. To this end, the image to be recorded is captured by an electronic image converter 212. The image converter 212 has not been illustrated for the overview camera 210. There are various options for the position of the overview camera 210. An inverted microscope is illustrated. The objective is situated above the sample in the case of reflecting sample observations.

An evaluation and control unit 214 processes the recorded overview image further within the meaning of the invention, provided the image has a calibration sample. It can identify specific calibration marks—in particular by image recognition/detection or classification—and/or else the relative position of the calibration sample 204 in/on the sample stage 202. To this end, the calibration sample 204 can be held in the holders 206 in, or on, the sample stage 202.

Using the trained machine learning system, a classification system 216 either present as part of the evaluation and control unit 214 or present separately can determine, by way of classification, individual calibration samples 204, features thereof or, by way of the positioning of the calibration sample 204 in the sample stage 206, a workflow indicator value which is used to select a calibration workflow 220 stored in a storage system 218.

The calibration control unit 222 can then perform the instructions of the calibration workflow individually or in conjunction with the evaluation and control unit 214— optionally also with a user—within the scope of which elements and/or components (not illustrated in any more detail) of the microscope system are calibrated. A transmitter unit 224, which is connected to the evaluation and control unit 214, can signal to a remote central service controller (not illustrated), either in wired or wireless fashion, that a calibration may be necessary (e.g., because the user has inserted a calibration sample) or has been carried out, which calibration measures or steps were performed when or which calibration measures or steps were undertaken. The performed calibration measures can also be logged in the storage system 218. In order to perform the calibration, use can also be made of images recorded by the image converter, which may be connected (not illustrated) to the evaluation and control unit 214.

Figure 3:
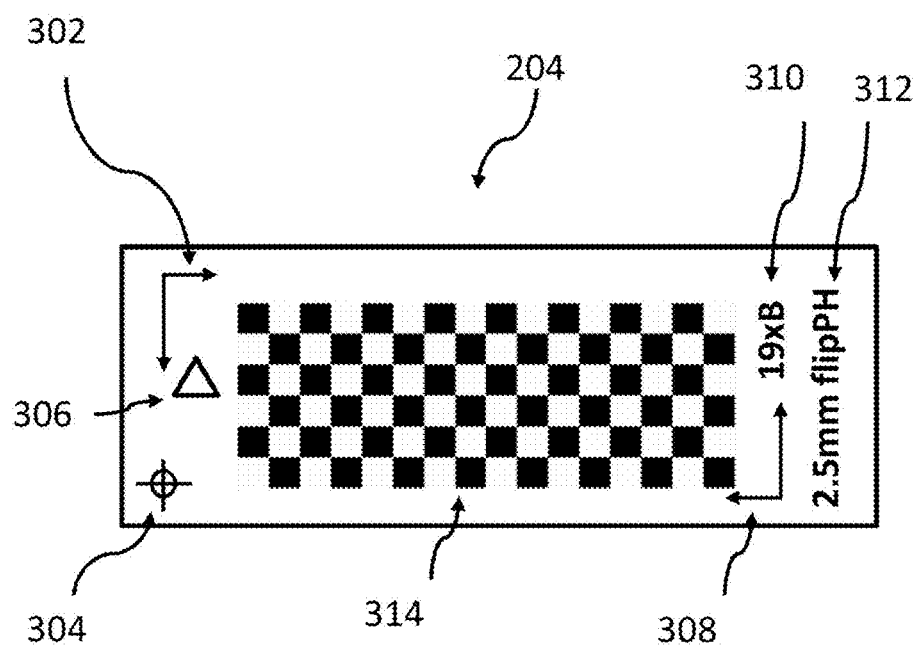
FIG. 3 illustrates a schematic diagram of a calibration sample having a plurality of patterns.

FIG. 3 illustrates a schematic diagram of a calibration sample 204 with a plurality of patterns that are detectable or classifiable by the detection system and/or classification system. One of the calibration patterns may already be selected prior to the classification such that only some of the patterns of the calibration sample 204 are made available to the classification system 216 for classification purposes. This procedure may also contain a normalization of the image data for the classification system. The details of the calibration sample 204 can be used individually or in a combination of individual selected patterns for the classification. The relative position of the calibration sample in the sample stage, or the sample holder thereof, can also be used for classification purposes.

Special markings of the calibration sample 204, such as, e.g., corner marks, such as the double-headed arrow 302 (or 308), the position marker 304, the alignment triangle 306, a specific label 310 and 312, which may also be written by hand, and the checkerboard-like pattern 314 in the center of the calibration sample 204 are also clearly visible. Any further position markers and patterns are conceivable.

Figure 4:
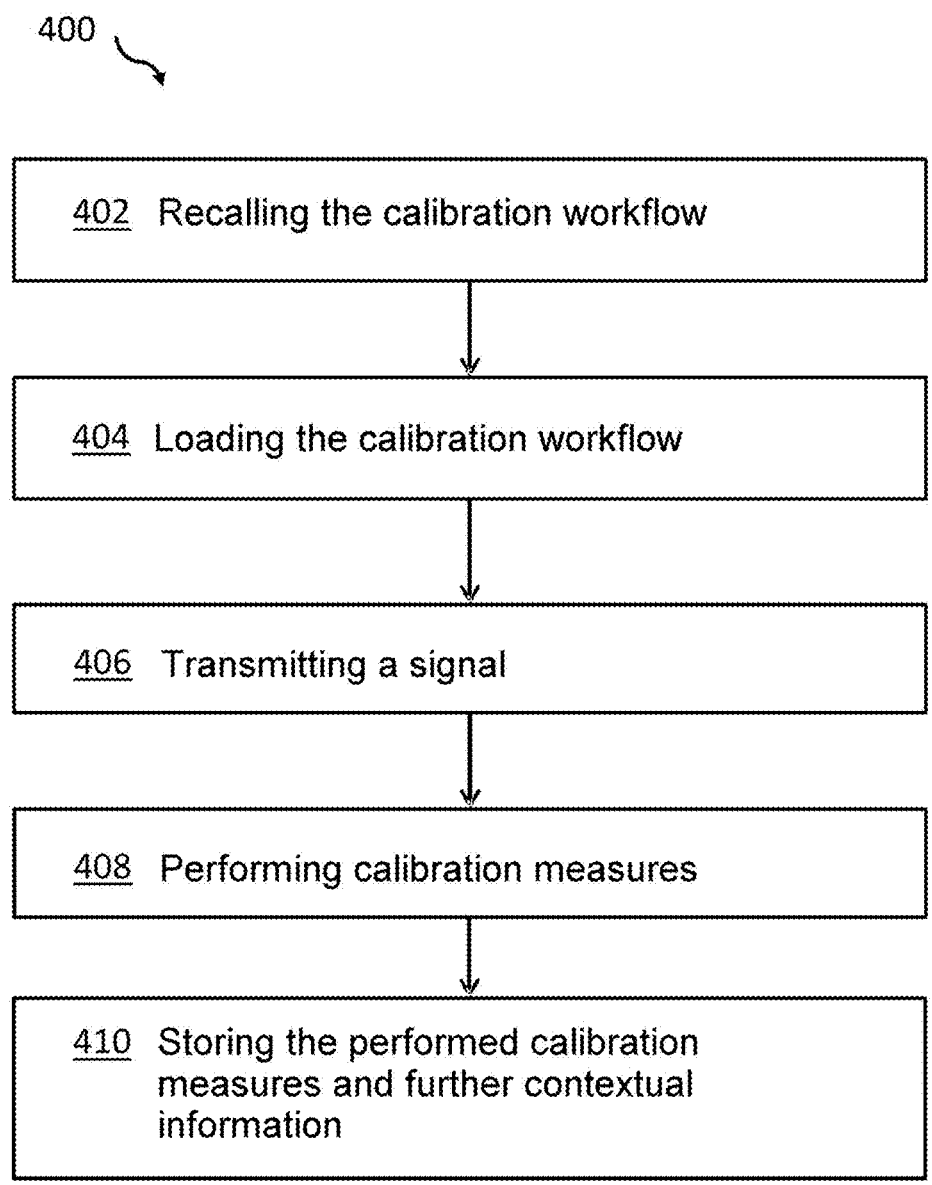
FIG. 4 illustrates further possible supplementary steps of the method as per FIG. 1.

FIG. 4 presents further possible supplementary steps 400 of the method as per FIG. 1, which can be carried out individually, in conjunction with the illustrated sequence or in any other sequence, or partly in parallel. The selected calibration workflow can be recalled, 402, in particular from the storage system 218 (cf. FIG. 2). Subsequent loading, 404, of the selected workflow—in particular into the calibration control unit 222 (cf. FIG. 2)—provides the preconditions to also carry out or perform, 408, the calibration workflow. Furthermore, an output of possible further selectable actions (406, transmitting a signal, e.g., to the manufacturer) can be effected, such that the user can select further steps. Moreover, the supplementary steps of the method can provide for information about the performed calibration measures and further contextual information to be stored, 410.

Figure 5:
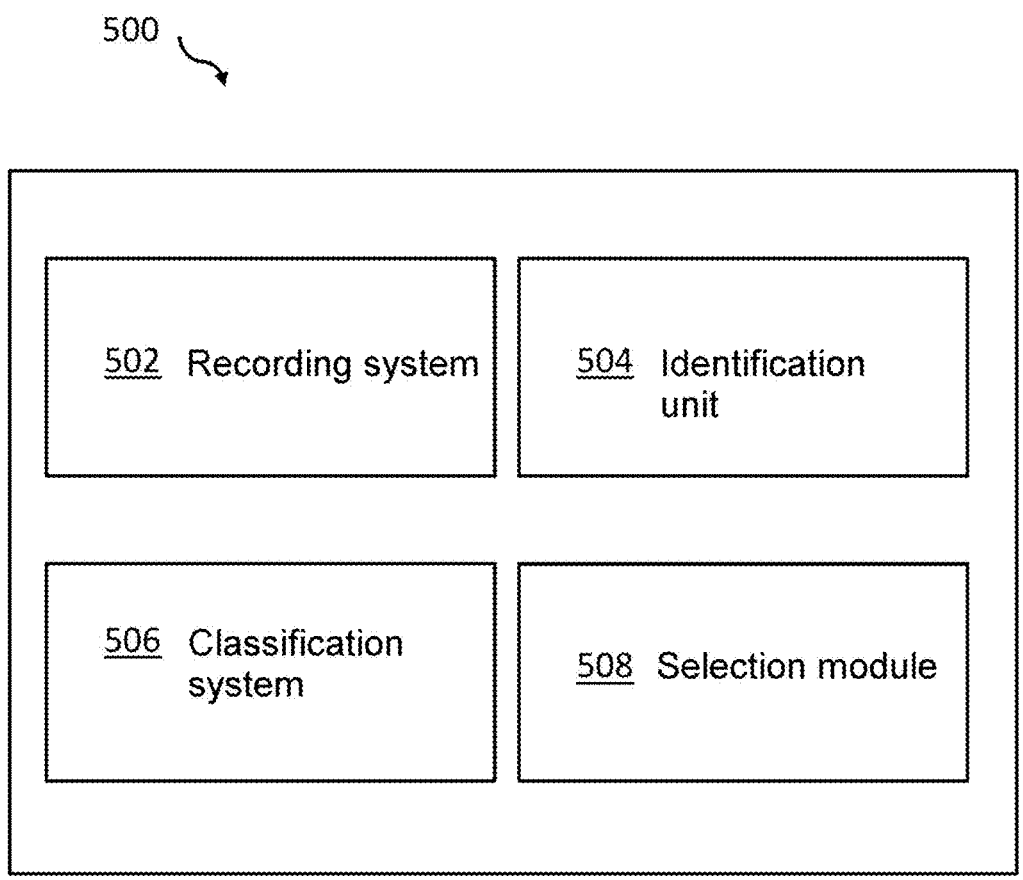
FIG. 5 illustrates a block diagram of one exemplary embodiment of the calibration system.

FIG. 5 illustrates a block diagram of one exemplary embodiment of the calibration system 500. The calibration system 500 for a calibration of a microscope system has an image recording system 502, e.g., the aforementioned overview camera or the microscope objective with image sensor. The latter is adapted for recording an overview image of a sample stage of the microscope system.

Moreover, the calibration system 500 has an identification unit 504—e.g., a part of the evaluation and control unit 214 (cf. FIG. 2)—adapted for identifying a calibration sample in the recorded overview image.

Moreover, the calibration system 500 has a classification system 506—e.g., the classification system 216 (cf. FIG. 2)—adapted for classifying the calibration sample in the recorded image into one of a plurality of calibration sample classes, the classification system having been trained using training data in order to form a model so that the classification system 216 is adapted for classifying unknown input data into prediction classes.

Finally, the calibration system 500 has a selection module 508 adapted for selecting a calibration workflow for calibrating the microscope system based on the classified calibration sample class, wherein the selection is performed by means of a workflow indicator value, which serves as an input value for a calibration system. Further modules of the calibration system 500 are not illustrated here but emerge from the description above.

Figure 6:
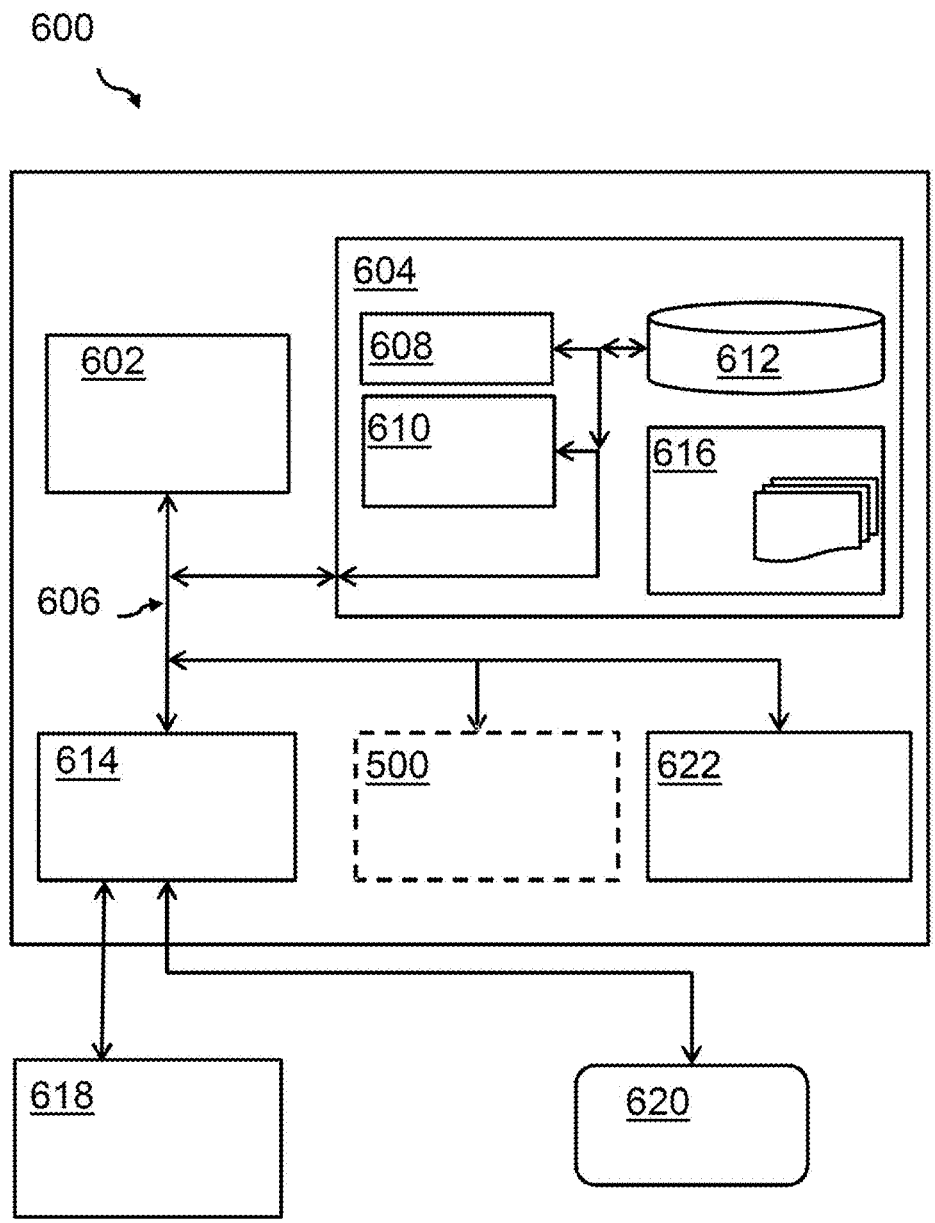
FIG. 6 illustrates a block diagram of a computer system that additionally has the calibration system as per FIG. 5.

FIG. 6 illustrates a block diagram of a computer system that may have at least parts of the calibration system. Embodiments of the concept proposed here may in principle be used with virtually any type of computer, regardless of the platform used therein to store and/or execute program codes. FIG. 6 illustrates by way of example a computer system 600 that is suitable for executing program code according to the method proposed here. A computer system already present in the microscope system may also serve as a computer system for executing the concept proposed here, possibly with corresponding expansions.

The computer system 600 has a plurality of general-purpose functions. The computer system may in this case be a tablet computer, a laptop/notebook computer, another portable or mobile electronic device, a microprocessor system, a microprocessor-based system, a smartphone or a computer system with specially configured special functions. The computer system 600 may be configured so as to execute computer system-executable instructions—such as for example program modules—that may be executed in order to implement functions of the concepts proposed here. For this purpose, the program modules may contain routines, programs, objects, components, logic, data structures etc. in order to implement particular tasks or particular abstract data types.

The components of the computer system may have the following: one or more processors or processing units 602, a storage system 604 and a bus system 606 that connects various system components, including the storage system 604, to the processor 602. The computer system 600 typically has a plurality of volatile or non-volatile storage media accessible by the computer system 600. The storage system 604 may store the data and/or instructions (commands) of the storage media in volatile form—such as for example in a RAM (random access memory) 608—in order to be executed by the processor 602. These data and instructions perform one or more functions or steps of the concept proposed here. Further components of the storage system 604 may be a permanent memory (ROM) 610 and a long-term memory 612 in which the program modules and data (reference sign 616) and also workflows may be stored.

The computer system has a number of dedicated apparatuses (keyboard 618, mouse/pointing device (not illustrated), screen 620, etc.) for communication purposes. These dedicated apparatuses may also be combined in a touch-sensitive display. An I/O controller 614, provided separately, ensures a frictionless exchange of data with external devices. A network adapter 622 is available for communication via a local or global network (LAN, WAN, for example via the Internet). The network adapter may be accessed by other components of the computer system 600 via the bus system 606. It is understood in this case, although it is not illustrated, that other apparatuses may also be connected to the computer system 600.

At least parts of the calibration system 500 (cf. FIG. 5) may also be connected to the bus system 606.

The description of the various exemplary embodiments of the present invention has been given for the purpose of improved understanding, but does not serve to directly restrict the inventive concept to these exemplary embodiments. A person skilled in the art will himself develop further modifications and variations. The terminology used here has been selected so as to best describe the basic principles of the exemplary embodiments and to make them easily accessible to a person skilled in the art.

The principle proposed here may be embodied as a system, as a method, combinations thereof and/or as a computer program product. The computer program product may in this case have one (or more) computer-readable storage media that contain computer-readable program instructions in order to prompt a processor or a control system to execute various aspects of the present invention.

Electronic, magnetic, optical, electromagnetic or infrared media or semiconductor systems are used as forwarding medium; for example SSDs (solid state devices/drives as solid state memory), RAM (random access memory) and/or ROM (read-only memory), EEPROM (electrically erasable ROM) or any combination thereof. Propagating electromagnetic waves, electromagnetic waves in waveguides or other transmission media (for example light pulses in optical cables) or electrical signals transmitted in wires also come into consideration as forwarding media.

The computer-readable storage medium may be an embodying apparatus that retains or stores instructions for use by an instruction execution device. The computer-readable program instructions that are described here may also be downloaded onto a corresponding computer system, for example as a (smartphone) app from a service provider via a cable-based connection or a mobile radio network.

The computer-readable program instructions for executing operations of the invention described here may be machine-dependent or machine-independent instructions, microcode, firmware, status-defining data or any source code or object code that may be written in, for example, C++, Java or the like or in conventional procedural programming languages such as for example the programming language "C" or similar programming languages. The computer-readable program instructions may be executed in full by a computer system. In some exemplary embodiments, it may also be electronic circuits such as for example programmable logic circuits, field-programmable gate arrays (FPGAs) or programmable logic arrays (PLAs) that execute the computer-readable program instructions by using status information of the computer-readable program instructions in order to configure or to customize the electronic circuits according to aspects of the present invention.

The invention proposed here is furthermore illustrated with reference to flowcharts and/or block diagrams of methods, apparatuses (systems) and computer program products according to exemplary embodiments of the invention. It is pointed out that virtually any block of the flowcharts and/or block diagrams may be designed as computer-readable program instructions.

The computer-readable program instructions may be made available to a general-purpose computer, a special computer or a data processing system able to be programmed in another way in order to create a machine such that the instructions that are executed by the processor or the computer or other programmable data processing apparatuses generate means for implementing the functions or procedures that are illustrated in the flowchart and/or block diagrams. These computer-readable program instructions may accordingly also be stored on a computer-readable storage medium.

In this sense, any block in the illustrated flowchart or the block diagrams may represent a module, a segment or portions of instructions that represent several executable instructions for implementing the specific logic function. In some exemplary embodiments, the functions that are illustrated in the individual blocks may be executed in another order, possibly also in parallel.

The illustrated structures, materials, sequences and equivalents of all of the means and/or steps with associated functions in the claims below are intended to apply all of the structures, materials or sequences as expressed by the claims.

REFERENCE SIGNS

100 Method for calibrating a microscope system
102 Method step of 100
104 Method step of 100
106 Method step of 100
108 Method step of 100
200 Exemplary positioning of individual components
202 Sample stage
204 Calibration sample
206 Holder
208 Overview camera
210 Objective
212 Image sensor
214 Control system
216 Classification system
218 Storage system
220 Workflow
222 Calibration control unit
302 Double-headed arrow
304 Position marker
306 Alignment triangle
308 Double-headed arrow
310 Specific labeling
312 Specific labeling
314 Checkerboard-like pattern
400 Supplementary method steps 402 Optional method step
404 Optional method step
406 Optional method step
408 Optional method step
410 Optional method step
500 Calibration system
502 Image recording system
504 Identification unit
506 Classification system
508 Selection module
600 Computer system
602 Processor
604 Storage system
606 Bus system
608 RAM
610 ROM
612 Long-term memory
614 I/O controller
616 Program modules, potential data
618 Keyboard
620 Screen
622 Network adapter

What is claimed is:

1. A computer-implemented method for calibrating a microscope system, the method comprising:
 recording an overview image of a sample stage of the microscope system;
 identifying a calibration sample in the recorded overview image;
 classifying, using a classification system trained using training data, the calibration sample in the recorded overview image into one of a plurality of calibration sample classes in order to form a model so that the classification system is adapted to classify unknown input data into prediction classes; and
 selecting a calibration workflow for calibrating the microscope system based on the classified calibration sample class, wherein the selection is performed using a workflow indicator value serving as an input value for a calibration system.

2. The method of claim 1, wherein the overview image is recorded by an overview camera or an objective of the microscope system.

3. The method of claim 1, wherein the classifying is based on at least one typical feature of the calibration sample, wherein the typical feature is selected from the group consisting of a geometry feature, a label, a texture, a material, an arrangement of calibration regions, and a color.

4. The method of claim 1, wherein the classification system is a neural network.

5. The method of claim 1, wherein the identification of the calibration sample employs contextual information, wherein the contextual information is selected from the group consisting of an indicator signal for a calibration position of the microscope system, an initialization signal for the calibration, a geometry, a relative position of the calibration sample, a software trigger of the calibration mode, and an indicator signal for a probability or the expected value of the presence of a calibration sample.

6. The method of claim 1, further comprising:
 Localizing, in the recorded overview image, a region required for the calibration.

7. The method of claim 1, wherein the selection of the calibration workflow is also based on identification of symbols on the calibration sample or an incorrect positioning of the calibration sample.

8. The method of claim 1, further comprising:
 loading a control system of the microscope system having control commands to start and carry out the selected calibration workflow.

9. The method of claim 8, further comprising:
 setting components of the microscope system based on the selected calibration workflow.

10. The method of claim 8, further comprising:
 storing, in a data memory, calibration results of the microscope system and parameter values of the performed calibration workflow.

11. The method of claim 1, further comprising:
 generating a service signal indicative of the identification of the calibration sample; and
 transmitting the service signal.

12. A calibration system for calibrating a microscope system, the calibration system comprising:
 a non-transitory memory storing a computer program product for calibrating the microscope system; and
 a processor coupled to the non-transitory memory, wherein when the computer program product executes the computer program product, the processor
  records an overview image of a sample stage of the microscope system;
  identifies a calibration sample in the recorded overview image;
  classifies, using a trained model, the calibration sample in the recorded overview image into one of a plurality of calibration sample classes, the trained model having been trained using training data so that the trained model is configured to classify unknown input data into prediction classes; and
 selects a calibration workflow for calibrating the microscope system based on the classified calibration sample class, wherein the calibration workflow is selected using a workflow indicator value serving as an input value for a calibration system.

13. A computer program product for calibrating a microscope system, wherein the computer program product has a non-transitory computer-readable storage medium having program instructions stored thereon, wherein when the program instructions are executed by one or more computers or control units, the one or more computers or control units:
 record an overview image of a sample stage of the microscope system;
 identify calibration sample in the recorded overview image;
 classify, using a classification system trained using training data, the calibration sample in the recorded overview image into one of a plurality of calibration sample classes in order to form a model so that the classification system is adapted to classify unknown input data into prediction classes; and
 select a calibration workflow for calibrating the microscope system based on the classified calibration sample class, wherein the selection is performed using a workflow indicator value serving as an input value for a calibration system.

* * * * *